United States Patent
Wallace et al.

(10) Patent No.: US 6,448,671 B1
(45) Date of Patent: Sep. 10, 2002

(54) DISTRIBUTED VEHICLE SAFETY SYSTEM HAVING FAULT PROTECTION

(75) Inventors: Jon K. Wallace, Redford; Russell J. Lynch, West Bloomfield, both of MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/369,138

(22) Filed: Aug. 5, 1999

(51) Int. Cl.[7] ............................................. B60R 16/00
(52) U.S. Cl. ................................................ 307/10.1
(58) Field of Search .................. 307/10.1; 701/36–49, 701/62, 76, 92, 97, 107; 370/221–224

(56) References Cited

U.S. PATENT DOCUMENTS

| | | | |
|---|---|---|---|
| 4,159,470 A | * 6/1979 | Strojny et al. | 340/147 SC |
| 4,347,602 A | * 8/1982 | Kister et al. | 370/85 |
| 5,255,962 A | * 10/1993 | Neuhaus et al. | 303/111 |
| 5,469,825 A | * 11/1995 | Golab et al. | 361/154 |
| 5,754,963 A | * 5/1998 | Nunneley et al. | 701/34 |
| 5,825,098 A | 10/1998 | Darby et al. | |
| 5,835,873 A | 11/1998 | Darby et al. | |
| 5,917,249 A | * 6/1999 | Kon'i et al. | 307/10.1 |
| 5,964,815 A | * 10/1999 | Wallace et al. | 401/45 |
| 6,034,995 A | * 3/2000 | Eisele et al. | 714/25 |
| 6,046,511 A | * 4/2000 | Kincaid | 307/10.1 |
| 6,061,600 A | * 5/2000 | Ying | 700/3 |
| 6,147,967 A | * 11/2000 | Ying et al. | 370/222 |

FOREIGN PATENT DOCUMENTS

| | | | | |
|---|---|---|---|---|
| DE | 19833462 A1 | * 1/2000 | | G08C/15/06 |
| JP | 10049506 A | * 2/1998 | | G06F/15/163 |
| JP | 11041266 A | * 2/1999 | | H04L/12/437 |
| JP | 11041268 A | * 2/1999 | | H04L/12/437 |

OTHER PUBLICATIONS

A SAE publication entitled "Bus System for Wiring Actuators of Restraint Systems," by Bauer et al., and believed to have been published in 1996.

* cited by examiner

*Primary Examiner*—Fritz Fleming
(74) *Attorney, Agent, or Firm*—Tarolli, Sundheim, Covell, Tummino & Szabo L.L.P.

(57) ABSTRACT

A distributed vehicle safety system (10) includes a plurality of devices (16), each of which performs a function associated with safety at a vehicle (12). A bus (18) conveys communication regarding the devices (16). An isolation device (28) is associated with each device (16) and electronically isolates one of the devices from the bus (18) upon occurrence of a fault condition. Preferably, the system (10) includes a plurality of control circuitries (26), each for controlling a respective one of the devices (16), and the control circuitry is isolated with the associated device (i.e., each control circuitry/device arrangement is isolated). In one embodiment, a plurality of bus connector/bus plug mated pairs (20 and 22) connects the plurality of control circuitry/ device arrangements (26 and 16) to the bus (18). Each connector/bus plug pair (20 and 22) includes a switch (e.g., 60) for enabling communication between a respective control circuitry/device arrangement (26 and 16) and the bus (18), and for disabling communication between the respective control/device arrangement and the bus in response to a fault condition.

28 Claims, 3 Drawing Sheets

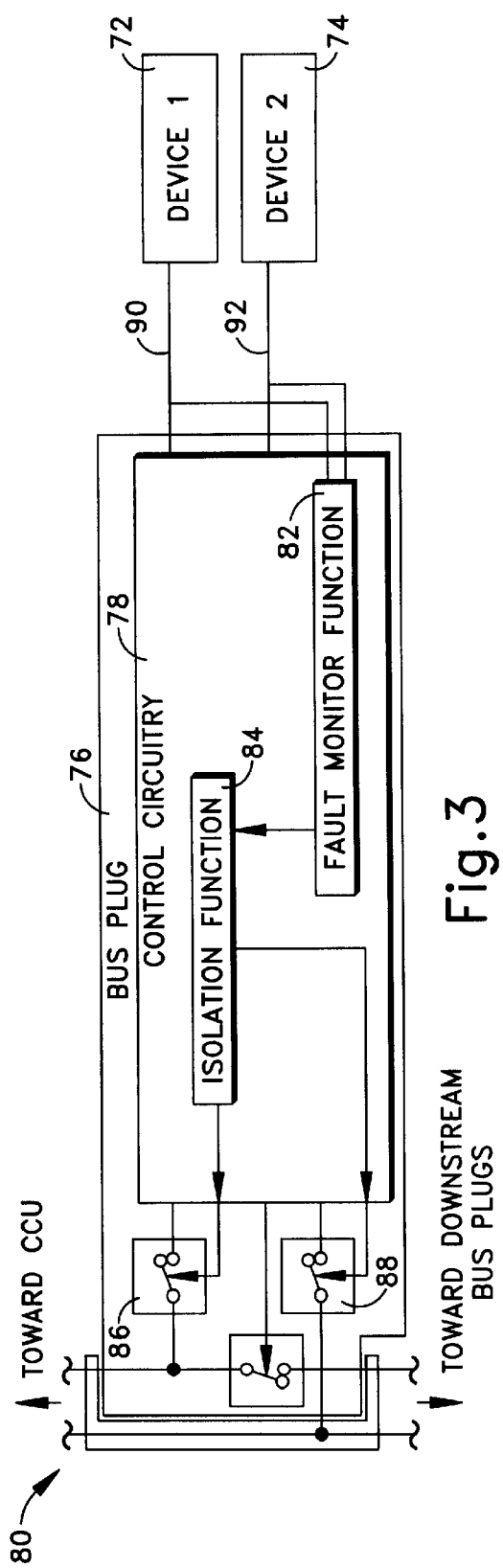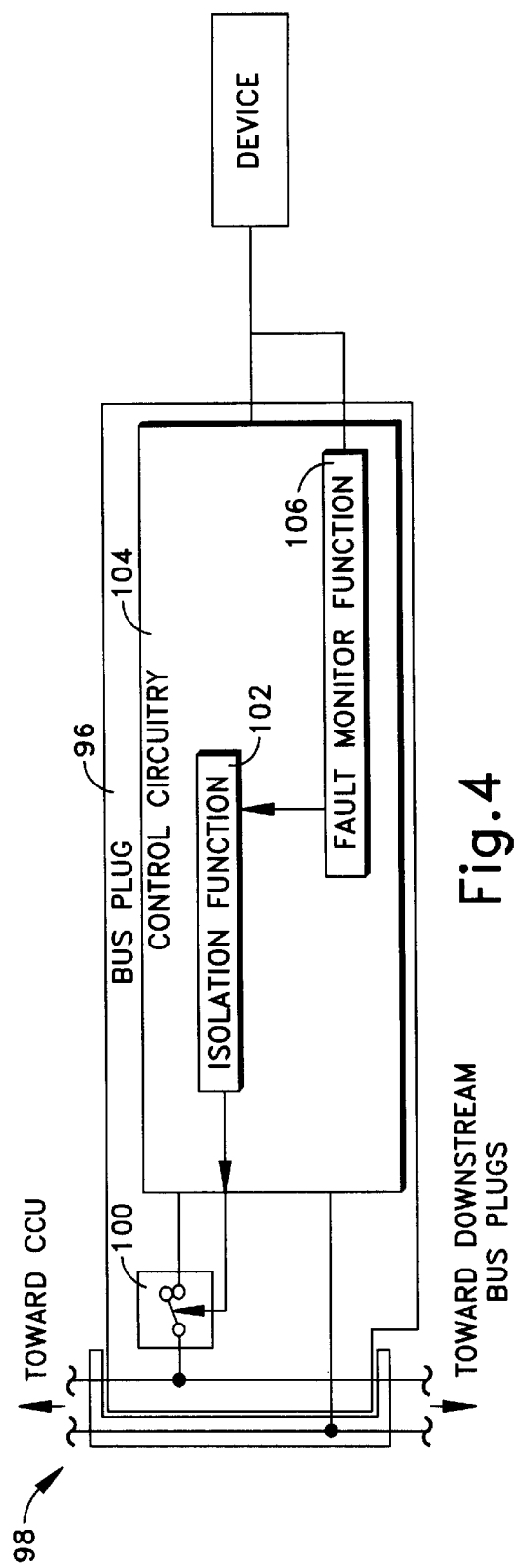

US 6,448,671 B1

DISTRIBUTED VEHICLE SAFETY SYSTEM HAVING FAULT PROTECTION

TECHNICAL FIELD

The present invention is generally directed to a vehicle safety system, such as an occupant protection system, that has a central control unit and a plurality of remote devices. The present invention is particularly directed to a system with features that can minimize potential communication interruptions.

BACKGROUND OF THE INVENTION

One type of vehicle safety system is an occupant protection system. The protection system includes one or more sensor devices for sensing vehicle characteristics and/or occupant characteristics. The sensed characteristics are used to determine whether a vehicle occupant needs to be protected (e.g., restrained) and/or determine a deployment profile of a device that accomplishes a protection function. Examples of the sensor devices include a vehicle acceleration sensor, an occupant position sensor, and an occupant weight sensor.

The system includes one or more actuatable protection devices for protecting (e.g., restraining) the occupant. Examples of such protection devices include an air bag module, a knee bolster module, and a seat belt pretensioner module.

As the sophistication of occupant protection systems has increased, the number and complexity of the sensor and protection devices in a single vehicle has increased. In response to the increased number and complexity of devices, there has been a movement toward centralized control of the devices to reduce cost and to increase reliability of the overall protection system. In order to accomplish the centralized control, a bus architecture is used for conveyance of communication signals. A potential exists that bus communication may be interrupted by such occurrences as crushing during a vehicle collision and associated deployment actuation of the protection devices within the system during the collision.

SUMMARY OF THE INVENTION

In accordance with one aspect, the present invention provides a distributed vehicle safety system.

The system includes a plurality of devices, each for performing a function associated with safety at a vehicle. Bus means conveys communication regarding the devices. Means electronically isolates one of the devices from the bus means upon occurrence of a fault condition.

In accordance with another aspect, the present invention provides a distributed vehicle safety system that includes a plurality of devices. Each of the devices performs a function associated with safety at a vehicle. The system includes a plurality of control means, each for controlling a respective one of the devices. Bus means conveys communication regarding the devices to the control means. The system includes means for electronically isolating one of the control means from the bus means upon occurrence of a fault condition.

In accordance with another aspect, the present invention provides a distributed vehicle safety system that includes a plurality of control/device arrangements. Each of the control/device arrangements accomplishes a function associated with safety at a vehicle. Bus means conveys communication to the control/device arrangements. A plurality of bus connector means connect the plurality of control/device arrangements to the bus means. Each bus connector means includes switch means for enabling communication between a respective control/device arrangement and the bus means and for disabling communication between the respective control/device arrangement and the bus means in response to a fault condition.

BRIEF DESCRIPTION OF THE DRAWINGS

The foregoing and other features and advantages of the present invention will become apparent to those skilled in the art to which the present invention relates upon reading the following description with reference to the accompanying drawings, wherein:

FIG. 3 is a schematic illustration of a portion of a system in accordance with a second embodiment of the present invention; and FIG. 4 is a schematic illustration of a portion of a system in accordance with a third embodiment of the present invention.

DESCRIPTION OF PREFERRED EMBODIMENTS

Figure 1:
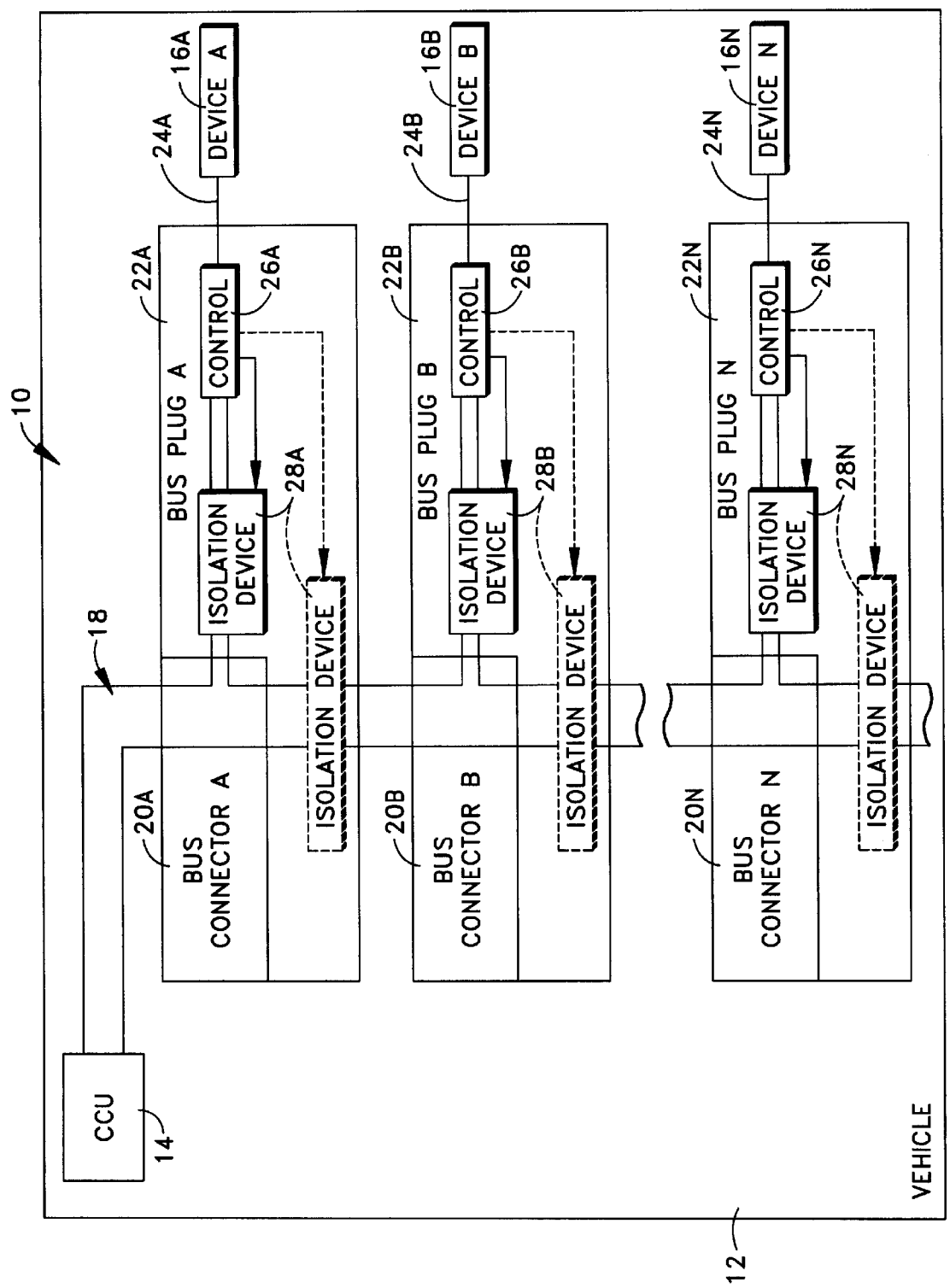
FIG. 1 is a schematic illustration of a system in accordance with the present invention within a schematic representation of a vehicle.

A representation of the present invention is schematically shown in FIG. 1 as a distributed vehicle safety system 10 for a vehicle 12. The system 10 includes a central control unit (hereinafter "CCU") 14 and a plurality (e.g., N) of remotely located devices 16A–16N. The remote devices 16A–16N may be any combination of safety system devices, and are thus illustrated in FIG. 1 as generic boxes. The system 10 includes a communication and power interconnection 18 that extends from the CCU 14 and a plurality of mated bus connector/bus plug pairs (e.g., 20A and 22A) located along the communication and power interconnection. The CCU 14 controls (e.g., causes performance of functions at the remote devices) the system 10 via the communication and power interconnection 18 and the mated bus connector/bus plug pairs.

It is to be appreciated that the bus connectors, the bus plugs, and the remote devices of the illustrated example are individually identified herein via alphabetic suffixes and that elements associated with the bus plugs/remote devices have elements that are identified by numbers with corresponding alphabetic suffixes. Herein, the alphabetic suffixes are sometimes omitted for generic discussions (i.e., applicable to any or all of the referenced numbered elements).

In the illustrated example, each remote device 16 is located away from the associated bus plug 22 and a connection 24 extends between the remote device and the associated bus plug. Control circuitry 26 located within the bus plug 22 handles interaction with the CCU 14 over the communication and power interconnection 18 for the associated remote device 16 (e.g., communication to/from the CCU regarding the associated remote device, and power receipt and distribution for the associated remote device). Further, the control circuitry 26 interacts with the associated remote device 16 via the connection 24.

The control circuitry 26 may include hardwired circuits for performing functions, a processor performing program functions, or a combination of hardwired circuits and a processor. Preferably, the electronic components within the bus plugs 22 are provided on an application specific integrated circuit (ASIC) chip. In one embodiment, each associated arrangement of remote device 16, bus plug 22 (with included control circuitry 26), and connection 24 is handled as a pre-assembled or pre-grouped unit.

At each bus connector/bus plug mated pair (e.g., 20A and 22A), an isolation device 28 is provided to isolate (e.g., disconnect) at least one control circuitry 26/remote device 16 from the communication and power interconnection 18. Preferably, each isolation device 28 is, or at least has a portion, interposed between the associated control circuitry 26 and the communication and power interconnection 18. Thus, each control circuitry 26 and the associated remote device 16 can be isolated (e.g., actually or effectively disconnected) from the communication and power interconnection 18 via the associated isolation device 28. In the illustrated example, the isolation device 28 is located within the bus plug 22.

As an alternative, the isolation device 28 is, or at least has a portion, interposed along the communication and power interconnection 18. The alternative configuration of the isolation device 28 being interposed along the communication and power interconnection 18 is represented in FIG. 1 by a dashed box. Preferably, the isolation device 28, or the portion of the isolation device, that is interposed along the communication and power interconnection 18 does not isolate the associated control circuitry/remote device, but rather isolates one or more of the other control circuitry/remote device assemblies from the communication and power interconnection.

The control circuitry 26 controls the isolation device 28. The isolation of control circuitry/associated remote device from the communication and power interconnection 18, and thus isolation from the CCU 14 and the other control circuitries (e.g., 26B–26N)/remote devices (e.g., 16B–16N), can be for various reasons. One example reason that results in the control circuitry 26 effectuating isolation is a problem (i.e., fault or damage) at either the remote device 16, the connection 24, or the control circuitry 26.

Figure 2:
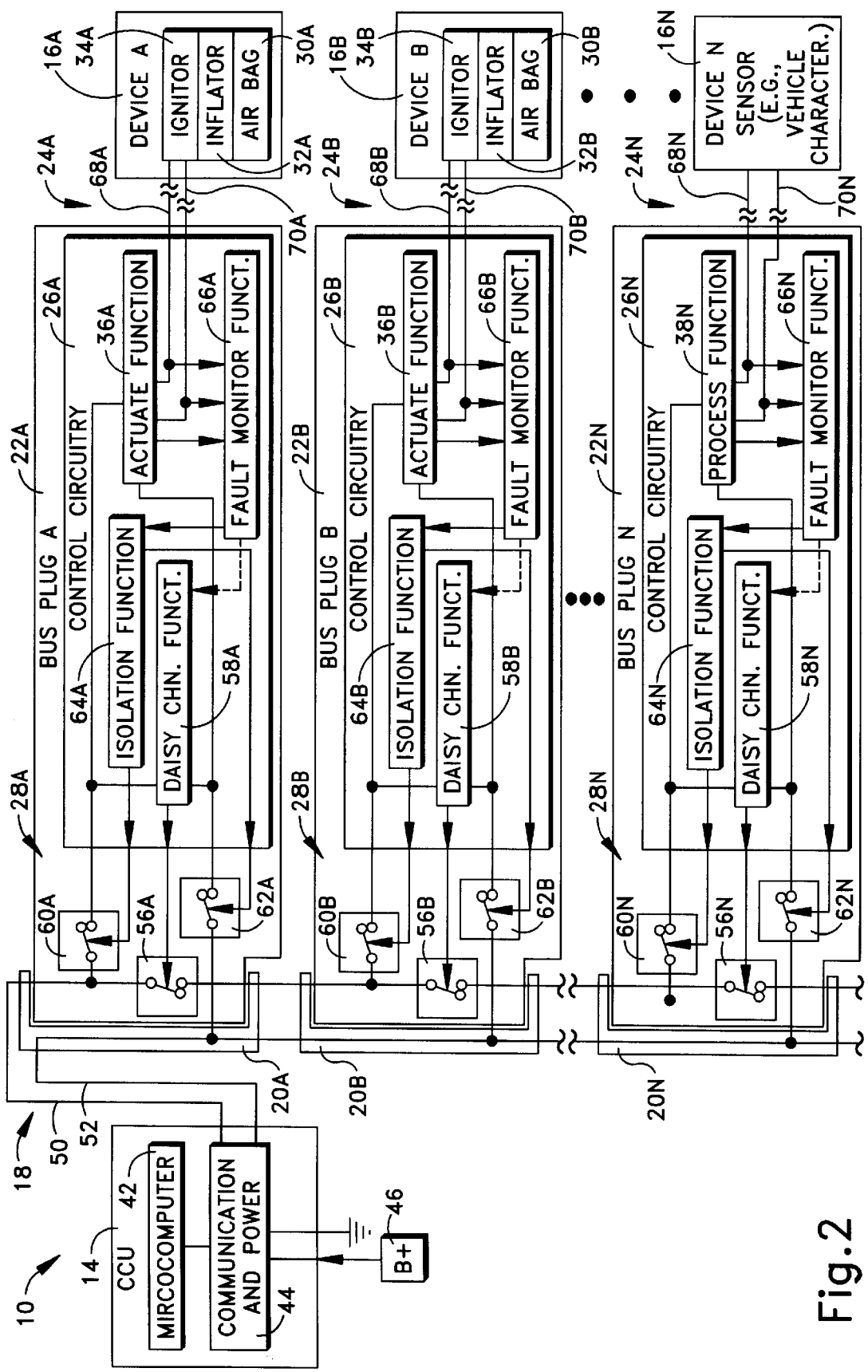
FIG. 2 is a schematic illustration of a system in accordance with a first embodiment of the present invention.

Turning to a specific implementation of the present invention, the system 10 (FIG. 2) preferably is a vehicle occupant protection system for helping to protect an occupant (not shown) of a vehicle (not shown in FIG. 2). Accordingly, the remote devices 16 are hereinafter generically referred to as protection system devices 16. Some of the protection system devices 16 are actuatable to help protect (e.g., restrain) the occupant, and some of the protection system devices are used to determine control (e.g., actuation) of the actuatable protection system devices.

Examples of actuatable protection system devices include an air bag module, a knee bolster module, a seat belt lock, a seat belt pretensioner module, and a D-ring adjuster module. A person of ordinary skill in the art will appreciate that the actuatable protection system devices may also have adjustable actuation variable(s). Such adjustable variables include deployment timing, air bag dynamic profile, pressure, etc.

For the purpose of illustration of the invention and not for the purpose of limitation, the specific example structure shown in FIG. 2 has actuatable protection system devices 16A and 16B that are air bag modules. Each air bag module includes an associated inflatable restraint 30, commonly referred to as an air bag. The air bag 30 is stored in a folded condition within the module in a manner well known in the art. A source 32 of inflation fluid (e.g., nitrogen gas) is provided to inflate the associated air bag 30. The source 32 of inflation fluid is commonly referred to as an inflator, and includes a stored quantity of pressurized inflation fluid and/or an inflation fluid generating material. The inflator 32 has an associated igniter 34 (e.g., a pyrotechnic squib), which is electrically activated to initiate flow of the inflation fluid from the inflator. The flow of inflation fluid to the air bag 30 inflates the air bag, as will be appreciated by a person of ordinary skill in the art.

The control circuitry (e.g., 26A) of the actuatable protection system devices (e.g., 16A) includes portions for handling communication regarding the associated protection system device and for controlling operation of the associated protection system device. For example, at the air bag modules (e.g., 16A), the control circuitry (e.g., 26A) includes an actuate function portion (e.g., 36A) that stores electrical energy for actuating the associated air bag module, and that receives actuation command communication from the CCU 14 to deliver actuation energy to the igniter (e.g., 34A) via the connection (e.g., 24A).

The protection system devices that are involved in the determination of control (e.g., actuation) of the actuatable protection system devices include sensor devices (e.g., 16N). Each sensor device (e.g., 16N) senses a characteristic that is used to determine whether the additional protection help (e.g., air bag restraint of occupant) is to be provided (e.g., actuation deployment of one or more of the actuatable protection system devices) and/or how the additional protection help is to be provided (e.g., adjustment of deployment of one or more of the actuatable protection system devices). Thus, the sensor devices (e.g., 16N) perform functions associated with protection of a vehicle occupant.

Examples of sensor devices include a vehicle crash sensor (e.g., an accelerometer), an occupant position sensor (e.g., an ultrasound or an infrared sensor), and an occupant weight sensor (e.g., a pressure sensor). The example shown within FIG. 2 contains one protection system device 16N that is a sensor device. For the purpose of illustration only and not for the purpose of limitation, the sensor device 16N is a vehicle characteristic sensor (e.g., an accelerometer).

The control circuitry 26 at each bug plug (e.g., 22N) for the sensor devices (e.g., 16N) includes a process function portion 38 that assembles sensory information provided from the sensor device via the connection (e.g., 24N), and provides communications that conveys the sensory information to the CCU 14. The process function portion 38 also handles power distribution to the associated sensor device, if needed.

The CCU 14 uses sensory input regarding the sensed characteristics from the sensor devices (e.g., 16N) to make determinations regarding protection system device control. In one example, the CCU 14 analyzes the information derived from the sensed characteristics and determines if a deployment crash condition is occurring (e.g., the CCU performs a crash algorithm). A deployment crash condition is one in which deployment (i.e., actuation) of one or more protection system devices is desirable to hopefully, in combination with other vehicle systems (e.g., seat belts or the like), enhance protection of the occupant. Preferably, the CCU 14 includes a microcomputer 42 to perform the analysis/determination function. Also, a person of ordinary skill in the art will appreciate that if the actuatable occupant protection system devices (e.g., 16A) have adjustable aspects (adjustable to tailor deployment actuation of the respective protection system device) the CCU 14 determines adjustment, and controls the adjustment of the deployment variable(s) accordingly.

The receipt of the sensory information at the CCU 14 and the provision of control commands from the CCU are via signals. The exchange (i.e., receipt/provision) of signals (e.g., sensory, command and others) and the provision of electrical power from the CCU 14 is via a communication and power portion 44 connected to the microcomputer 42 and a vehicle power source 46 (i.e., the vehicle battery).

Turning to the communication and power interconnection 18, in the illustrated embodiment of FIG. 2, the communication and power interconnection includes two electrically conductive connector lines 50 and 52, and is hereinafter referred to as the bus 18. The lines 50 and 52 of the bus 18 are connected to the communication and power portion 44 of the CCU 14, and extend from the communication and power portion toward the plurality of protection system devices 16.

Preferably, one (e.g., 50) of the lines is provided via a daisy chain connection that passes through the bus plugs 22. In other words, the line 50 is partly comprised of segments that extend through the bus plugs 22. At each bus plug 22, a daisy chain switch 56 (e.g., a transistor) is located on the portion of the line 50 that extends through the bus plug.

For nomenclature, a bus plug (e.g., 22B) that has a daisy chain switch (e.g., 56A) interposed between that bus plug and the CCU 14 is referred to as being downstream of the interposed daisy chain switch. Also, the nomenclature of downstream extends to the components (e.g., the protection system device) associated with the bus plug. If an upstream daisy chain switch (e.g., 56A) is open, the downstream bus plug(s) (e.g., 22A), if any, are not connected to the line 50. In other words, the control circuitry (e.g., 26N) of a bus plug (e.g., 22N) is not able to interact with the CCU 14 until all upstream daisy chain switch(es) (e.g., 56B), if any, are closed.

At each bus plug 22, a daisy chain function portion 58 of the control circuitry 26 controls the daisy chain switch 56. Thus, the control circuitry 26 controls connection of downstream control circuitries/protection system devices onto the bus 18. In one example, control of the daisy chain switch 56 is in response to addressing/programming of the control circuitry 26. Specifically, the daisy chain function portion 58 closes the daisy chain switch 56 in response to the CCU 14 providing the addressing/programming.

In the illustrated example, the daisy chain switches 56 are closed, thus all addressing/programming has already been accomplished. During operation of the system 10, it is normal that all of the daisy chain switches 56 are closed. Typically, daisy chain switches are open during an initial assembly of the system 10, and upon a replacement of a protection system device 16/associated bus plug 22.

Turning to the isolation function of the present invention, preferably, the isolation device 28 at each bus plug 22 is comprised of two isolation switches 60 and 62. However, it is to be noted that as alternatives to the use of isolation switches 60 and 62 as the isolation device 28, the isolation device may be comprised of the daisy chain switch or may be comprised of the isolation switches and the daisy chain switch. These alternatives are discussed herein later.

The first isolation switch 60 is interposed between the first line 50 of the bus 18 and the associated control circuitry 26, and the second isolation switch 62 is interposed between the second line 52 of the bus and the associated control circuitry. Preferably, the isolation switches 60 and 62 are transistors. Thus, the control circuitry 26 and the associated protection system device 16 are electronically isolatable from the bus 18. At each bus plug 22, the connection of the first isolation switch 60 to the first line 50 is upstream of the associated daisy chain switch 56, such that daisy chain switch operation does not interfere with connection of the associated control circuitry 26 with the bus 18.

The isolation switches 60 and 62 are controlled by an isolation function portion 64 of the control circuitry 26. Normally, the isolation switches 60 and 62 are closed. Isolation of a control circuitry 26, and thus isolation of the associated protection system device 16, from the bus 18 occurs when the isolation switches 60 and 62 are opened.

A fault monitor function portion 66 of the control circuitry 26 monitors one or more conditions that can occur at the control circuitry, the associated protection system device 16, or the connection 24 between the control circuitry and the protection system device. The fault monitor function portion 66 outputs a signal to the isolation function portion 64 that is indicative of a detected fault. In response to the fault-indicating signal, the isolation function portion 64 opens the isolation switches 60 and 62. In addition, the fault monitor function portion 66 and/or the isolation function portion 64 may be responsive to communication on the bus 18.

Preferably, the fault monitor function portion 66 monitors electrical conditions on lines 68 and 70 of the connection 24 between the control circuitry 26 and the protection system device 16. Examples of monitored conditions for the lines 68 and 70 that result in a determination to isolate the control circuitry 26 from the bus 18 include a shorting of one or both lines 68 and 70 to ground or power. Another example of a monitored condition that results in a determination to isolate the control circuitry 26 from the bus 18 includes a shunting the lines 68 and 70 together. Such condition(s) can be the result of damage that occurs during a vehicle collision and/or actuation of the associated protection system device 16. Thus, an electrical problem at one control circuitry/protection system device does not disrupt bus communication for the other control circuitries/protection system devices.

As noted above, the daisy chain switch 56 may either be a part of the isolation device 28 (represented in FIG. 2 via dashed lines) or may be the isolation device (i.e., without the switches 60 and 62). When the isolation device 28 includes the daisy chain switch 56, the isolation device operates to isolate at least one downstream bus plug 22/protection system device 16 from the bus 18. Specifically, when an upstream daisy chain switch (e.g., 56A) is opened, the downstream control circuitry (e.g., 26B) is not connected to the bus 18.

Turning to FIG. 3, a portion of another embodiment in accordance with the present invention is shown (certain elements are omitted from FIG. 3 for simplicity). In this embodiment, a plurality (e.g., labeled 1 and 2) of remote devices 72 and 74 are connected to a single bus plug 76. Control circuitry 78 at the bus plug 76 interacts with a bus 80 to handle bus communication regarding the two remote devices 72 and 74, and also interacts with the two remote devices. A fault monitor function portion 82 of the control circuitry 78 monitors for various fault conditions, and causes an isolation function portion 84 to open isolation switches 86 and 88 upon the occurrence of a fault.

Preferably, the fault monitor function portion 82 monitors for faults with regard to both of the remote devices 72 and 74. Specifically, the fault monitor function portion 82 monitors conditions at a connection 90 between the control circuitry 78 and the first remote device 72, and at a connection 92 between the control circuitry and the second remote device 74. Preferably, each of the connections 90 and 92 includes two wires that are monitored for shorting to power or ground, and shunting.

Turing to FIG. 4, a portion of another embodiment in accordance with the present invention is shown (certain elements are omitted from FIG. 4 for simplicity). In this embodiment, bus plugs 96 (only one shown) are not connected in a daisy chain manner along the provided bus 98. Accordingly, a daisy chain switch is not present in the bus plug 96 of the embodiment of FIG. 4. Also, only a single isolation switch 100 is present in the bus plug 96 of the embodiment of FIG. 4.

Opening the isolation switch 100 by an isolation function portion 102 of control circuitry 104 effectively isolates the control circuitry from the bus 98. As in the previous embodiments, a fault monitor function portion 106 of the control circuitry 104 provides a signal indicative of a fault detection that results in the opening of the isolation switch 100.

From the above description of the invention, those skilled in the art will perceive improvements, changes and modifications. For example, some of the portions (e.g., the actuate function portion or the process function portion) of the control circuitry 26 may be located at the respective protection system device 16. For such an arrangement, control communication, and possibly power, is passed through the bus plug 22 and the connection 24 to the protection system device 16. The portions of the control circuitry 26 remaining at the bus plug have only the duties of monitoring for faults and controlling isolation in response to detected faults. Such improvements, changes and modifications within the skill of the art are intended to be covered by the appended claims.

Having described the invention, the following is claimed:

1. A distributed vehicle safety system comprising:

a plurality of control/device arrangements for accomplishing a function associated with safety at a vehicle;

bus means for conveying communication to said control/device arrangements; and a plurality of bus connector means for connecting said plurality of control/device arrangements to said bus means, each bus connector means including switch means for enabling communication between a respective control/device arrangement and said bus means and for disabling communication between said respective control/device arrangement and said bus means in response to a fault condition at a component associated with said respective control/device arrangement; and a plurality of electronic switches, interposed along a line of said bus connector means, each associated with a respective one of said control/device arrangements and for enabling or disabling passage of communication on said bus means beyond the respective electronic switch in response to a fault condition at a component associated with a control/device arrangement located beyond the respective electronic switch.

2. A system as set forth in claim 1, each bus connector means includes means for determining the occurrence of a fault condition at said control/device arrangement, said switch means disabling communication being responsive to the determination of said means for determining.

3. A system as set forth in claim 1, wherein said switch means for enabling communication between said respective control/device arrangement and said bus means includes an electronic switch interposed along a line extending from said bus means.

4. A system as set forth in claim 1, wherein said switch means for enabling communication between said respective control/device arrangement and said bus means includes a first electronic switch interposed along a first line extending from said bus means, and a second electronic switch extending along a second line extending from said bus means.

5. A system as set forth in claim 1, wherein said bus means also conveys power for use by said devices.

6. A system as set forth in claim 1, wherein said system is a vehicle occupant protection system, and one of said plurality of control/device arrangements including an actuatable occupant protection device.

7. A distributed vehicle safety system comprising:

a plurality of devices, each for performing a function associated with safety at a vehicle;

bus means for conveying communication regarding said devices;

means, associated with a first one of said devices, for determining the occurrence of a fault condition at a component associated with said first device;

means, associated with said first device, for electronically isolating said first device from said bus means upon determination of the fault condition at the component associated with said first device;

means, associated with said first device, for determining the occurrence of a fault condition at a component associated with another of said devices; and means, associated with said first device, for electronically isolating said another device from said bus means upon determination of the fault condition at the component associated said another device.

8. A system as set forth in claim 7, wherein said means for isolating said first device includes an electronic switch interposed along a line extending from said bus means.

9. A system as set forth in claim 7, wherein said means for isolating said first device includes a first electronic switch interposed along a first line extending from said bus means, and a second electronic switch interposed along a second line extending from said bus means.

10. A system as set forth in claim 7, including a plurality of connector means for connecting said plurality of devices to said bus means, each of said connector means including a connection line extending to a respective one of said devices, said means for determining the occurrence of a fault condition at a component associated with said first device includes means for monitoring the associated one of said connection lines.

11. A system as set forth in claim 7, wherein said means for isolating said another device includes an electronic switch interposed along a line of said bus means.

12. A system as set forth in claim 7, wherein said means for isolating said another device being also for isolating a group of said devices from said bus means.

13. A system as set forth in claim 12, including a plurality of control means, each for controlling at least an associated one of said devices, one of said control means controlling more than one of said devices, wherein said means for isolating a group of said devices includes means for isolating said devices controlled by said one of said control means.

14. A system as set forth in claim 7, wherein said bus means also conveys power for use by said devices.

15. A system as set forth in claim 7, including control means, associated with said one device, for receiving communication regarding said one device from said bus means and for controlling said one device, said means for isolating said first device also for electronically isolating said control means from said bus.

16. A system as set forth in claim 15, including a connection line extending between said control means and said one device, and said means for determining the occurrence of a fault condition at a component associated with said first device includes means for determining the occurrence of a fault condition at said connection line, said means for isolating said first device and said control means being responsive to the determination of said means for determining the occurrence of the fault condition at said connection line.

17. A system as set forth in claim 7, including a connection line extending to said one device, and said means for determining the occurrence of a fault condition at a component associated with said first device includes means for determining the occurrence of a fault condition at said connection line, said means for isolating said first device being responsive to the determination of said means for determining the occurrence of the fault condition at said connection line.

18. A system as set forth in claim 17, wherein said means for determining the occurrence of the fault condition at said connection line includes means for determining whether a short is present at said connection line.

19. A system as set forth in claim 7, wherein said system is a vehicle occupant protection system, said plurality of devices including an actuatable occupant protection device.

20. A distributed vehicle safety system comprising:
   a plurality of devices, each for performing a function associated with safety at a vehicle;
   a plurality of control means, each for controlling a respective one of said devices;
   bus means for conveying communication regarding said devices to said control means;
   means, associated with a first one of said control means, for determining the occurrence of a fault condition at a component associated with said first control means;
   means, associated with said first control means, for electronically isolating said first control means from said bus means upon determination of the fault condition at the component associated with said first control means;
   means, associated with said first control means, for determining the occurrence of a fault condition at a component associated with another of said control means; and
   means, associated with said first control means, for electronically isolating said another control means from said bus means upon determination of the fault condition at the component associated said another control means.

21. A system as set forth in claim 20, including a spacing connection between said first of said control means and said respective device to space said respective device as way from said first control means.

22. A system as set forth in claim 20, wherein said component associated with said first control means is a connection between said a first control means and said respective device that includes a line, said means for determining a fault condition at a component associated with said first control means including means for determining a short condition at the line as the fault condition.

23. A system as set forth in claim 20, wherein said means for isolating said first control means includes an electronic switch interposed along a line extending from said bus means.

24. A system as set forth in claim 20, wherein said means for isolating said first control means includes a first electronic switch interposed along a first line extending from said bus means, and a second electronic switch interposed along a second line extending from said bus means.

25. A system as set forth in claim 20, wherein said means for isolating said another control means includes an electronic switch interposed along a line of said bus means.

26. A system as set forth in claim 20, wherein said means for isolating said another control means including means for isolating a group of said control means from said bus means upon occurrence of the fault condition at a component associated with said another of said control means.

27. A system as set forth in claim 20, wherein said bus means also conveys power for use by said devices.

28. A system as set forth in claim 20, wherein said system is a vehicle occupant protection system, said plurality of devices including an actuatable occupant protection device.

* * * * *